United States Patent
Vanleeuwen et al.

(10) Patent No.: US 12,360,946 B2
(45) Date of Patent: Jul. 15, 2025

(54) SYSTEM AND METHOD OF LARGE FILE EXTRACTION

(71) Applicant: SHINYDOCS CORPORATION, Kitchener (CA)

(72) Inventors: Peter Vanleeuwen, Guelph (CA); Mark Kraatz, Waterloo (CA); Khalid Merhi, Kitchener (CA); Abdulrahman Alamoudi, Ottawa (CA); Benjamin Barth, Waterloo (CA)

(73) Assignee: SHINYDOCS CORPORATION

( * ) Notice: Subject to any disclaimer, the term of this patent is extended or adjusted under 35 U.S.C. 154(b) by 168 days.

(21) Appl. No.: 18/359,841

(22) Filed: Jul. 26, 2023

(65) Prior Publication Data
US 2024/0037068 A1 Feb. 1, 2024

Related U.S. Application Data

(60) Provisional application No. 63/392,243, filed on Jul. 26, 2022.

(51) Int. Cl.
*G06F 16/13* (2019.01)
*G06F 16/16* (2019.01)

(52) U.S. Cl.
CPC .............. *G06F 16/13* (2019.01); *G06F 16/16* (2019.01)

(58) Field of Classification Search
None
See application file for complete search history.

(56) References Cited

U.S. PATENT DOCUMENTS

| 11,983,486 B1* | 5/2024 | Mariko | G06N 3/0475 |
| 2006/0282758 A1* | 12/2006 | Simons | G06F 16/9577 382/173 |
| 2010/0161655 A1* | 6/2010 | Gil | G06F 16/313 707/769 |
| 2011/0219003 A1* | 9/2011 | Bi | G06F 16/00 707/739 |
| 2011/0270820 A1* | 11/2011 | Agarwal | G06F 16/31 707/E17.108 |
| 2015/0213043 A1* | 7/2015 | Ishii | G06F 16/211 707/741 |

* cited by examiner

*Primary Examiner* — Eddy Cheung (57) ABSTRACT

A system and method for extracting full text from source files of any size in such a manner that all text can be rapidly and accurately searched via search engine while maintaining satisfactory system performance. A software tool that integrates with file shares or an enterprise content management system with the ability to merge and serialize the results of the extracted text via surrogate index files. The software tool is configured to handle text from large files in order to extract, store and access the file such that all of the text is searchable, regardless of the size of the original document in a reasonable amount of time. The Analytics Engine will omit this field during search and handle this field separately from other fields.

20 Claims, 4 Drawing Sheets

SYSTEM AND METHOD OF LARGE FILE EXTRACTION

CROSS REFERENCE TO RELATED APPLICATION

The application claims priority and the benefit of U.S. Provisional Patent Application Ser. No. 63/392,243, entitled "SYSTEM AND METHOD OF LARGE FILE EXTRACTION", filed on Jul. 26, 2022, the disclosure of which is incorporated herein by reference in its entirety.

FIELD

This disclosure relates to computer systems and, more specifically, to the extraction, storage, and access of text from large files found in those systems.

BACKGROUND

Enterprise file shares or enterprise content management systems are often used to store files and other data for access by users of an organization's computing systems.

Since the start of the digital revolution, organizations have been creating digital content at an accelerating pace without considering how to find, manage, and action all these unstructured documents. At a mid-sized organization, this can amount to hundreds of terabytes (TB) of data (which corresponds to hundreds of millions of documents). At a large-sized organization, this can amount to petabytes (PB) of data (each petabyte corresponds to about a billion documents).

While some of these documents are small or medium in size, many of them are fairly large and some could even be considered huge—with regard to the amount of text that is contained within the documents. The ability to extract and index ALL of the text from within these documents is important when it comes to being able to search that text (via a search engine) in order to find a word or phrase that is important to the searcher. Probably more important is being able to find text in order to support compliance standards such as GDPR (where an organization may be required to find and delete all references to a person's name and associated data) or identifying documents containing PII (personally identifiable information). It is therefore incredibly important to be able to extract and index ALL of the text from these documents, regardless of the size of the original document (because if not all text is findable, these values could be missed).

To date, implementations of Shinydocs' Cognitive Toolkit product have limited text extraction to a modest amount of data—typically only 32,000 characters (which is equivalent to approximately 13 pages of full text found in a Microsoft Word or PDF document). This limitation has been determined to be necessary to avoid the following observed issues with underlying open source, 3rd party search technology (such as Elasticsearch), that have been encountered when extracting much larger amounts of text (over 100,000 characters for example):
 1. The index becomes unusably slow, taking upwards of 5 seconds to perform extremely trivial queries.
 2. The index becomes unstable, causing crashes on Elasticsearch nodes, and making the product unusable.

This trade-off between how much text can be extracted while maintaining system performance is not ideal for most use cases. There is a desire to have the ability to extract all of the text from all document requests in order to maximize the effectiveness and accuracy of search functionality for any size of document.

SUMMARY

A system and method for extracting full text from source files of any size in such a manner that all text can be rapidly and accurately searched via a search engine while maintaining satisfactory system performance. A system and method for generating and linking multiple records from a single large source file. A system and method for large file text extraction in the indexing of content from file shares or an enterprise content management system. An Analytics Engine with the ability to merge and serialize the results of the extracted text via surrogate index files.

BRIEF DESCRIPTION OF THE DRAWINGS

The drawings illustrate, by way of example only, embodiments of the present disclosure.

DETAILED DESCRIPTION

This disclosure concerns exposing remote file shares or a remote content management system to a server running the Shinydocs Cognitive Suite (i.e., an exemplary content management system). Shinydocs Cognitive Suite includes an Analytics Engine. Information will be transferred from the remote file shares or remote content management system to the Cognitive Suite, which will then be embellished using various automated methods to assign attributes to each of these documents (in the Cognitive Suite). Upon completion, these attributes can be searched in the Analytics Engine.

Figure 1:
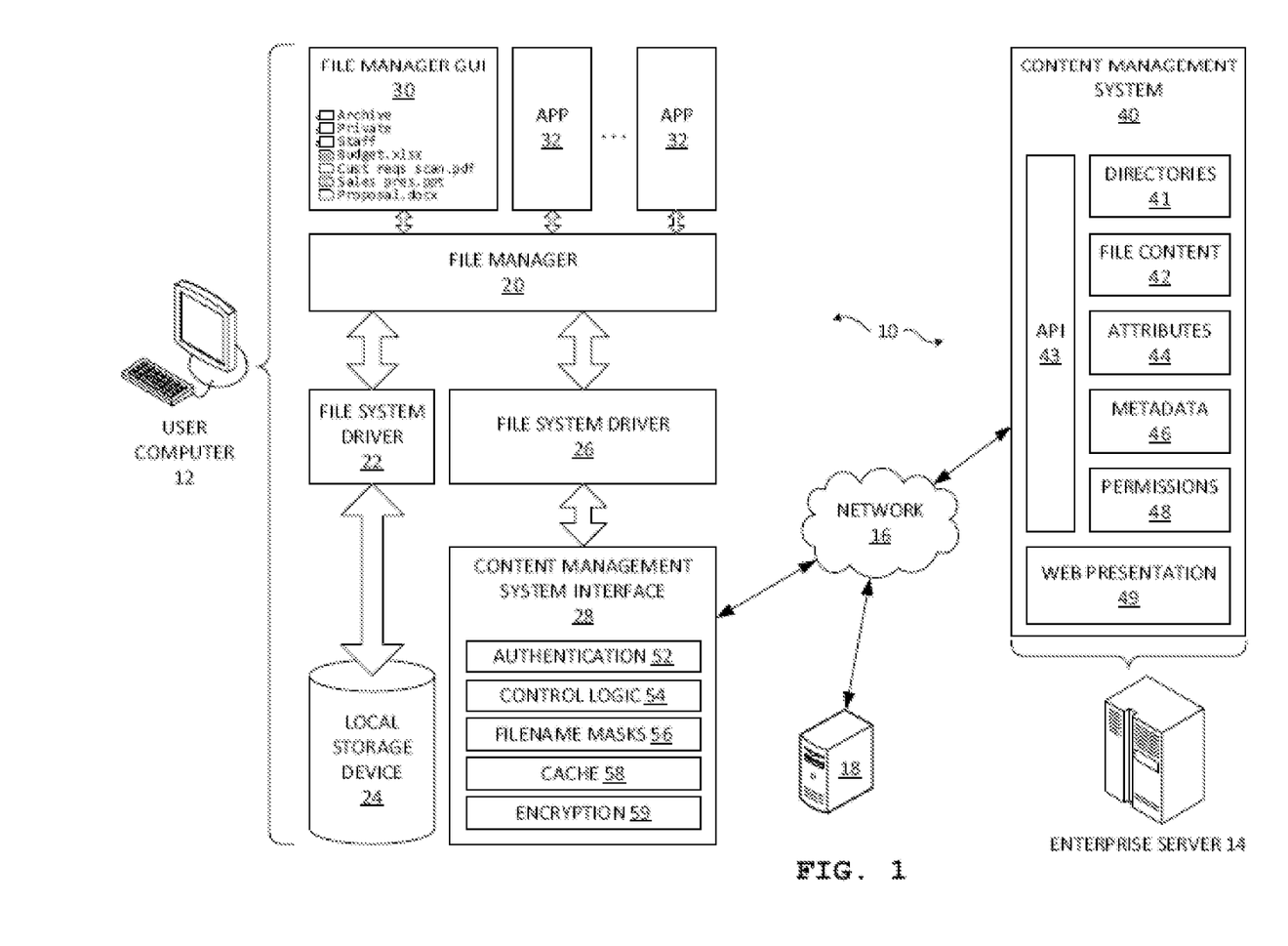
FIG. 1 is a block diagram of a networked computer system.

FIG. 1 shows a typical networked computer system 10 according to the present invention. The system 10 includes at least one user computer device 12 and at least one server 14 connected by a network 16.

The user computer device 12 can be any computing device such as a desktop or notebook computer, a smartphone, tablet computer, and the like. The user computer device 12 may be referred to as a computer.

The server 14 is a device such as a mainframe computer, blade server, rack server, cloud server, or the like. The server 14 may be operated by a company, government, or other organization and may be referred to as an enterprise server or an enterprise content management (ECM) system.

The network 16 can include any combination of wired and/or wireless networks, such as a private network, a public network, the Internet, an intranet, a mobile operator's network, a local-area network, a virtual-private network (VPN), and similar. The network 16 operates to communicatively couple the computer device 12 and the server 14.

In a contemplated implementation, a multitude of computer devices 12 connect to several servers 14 via an organization's internal network 16. In such a scenario, the servers 14 store documents and other content in a manner that allows collaboration between users of the computer devices 12, while controlling access to and retention of the content. Such an implementation allows large, and often geographically diverse, organizations to function. Document versioning or/and retention may be required by some organizations to meet legal or other requirements.

The system 10 may further include one or more support servers 18 connected to the network 16 to provide support services to the user computer device 12. Examples of support services include storage of configuration files, authentication, and similar. The support server 18 can be within a domain controlled by the organization that controls the servers 14 or it can be controlled by a different entity.

The computer device 12 executes a file manager 20, a local-storage file system driver 22, a local storage device 24, a remote-storage file system driver 26, and a content management system interface 28.

The file manager 20 is configured for receiving user file commands from a user interface (e.g., mouse, keyboard, touch screen, etc.) and outputting user file information via the user interface (e.g., display). The file manager 20 may include a graphical user interface (GUI) 30 to allow a user of the computer 12 to navigate and manipulate hierarchies of folders and files, such as those residing on the local storage device 24. Examples of such include Windows Explorer and Mac OS Finder. The file manager 20 may further include an application programming interface (API) exposed to one or more applications 32 executed on the computer 12 to allow such applications 32 to issue commands to read and write files and folders. Generally, user file commands include any user action (e.g., user saves a document) or automatic action (e.g., application's auto-save feature) performed via the file manager GUI 30 or application 32 that results in access to a file. The file manager GUI 30 and API may be provided by separate programs or processes. For the purposes of this disclosure, the file manager 20 can be considered to be one or more processes and/or programs that provide one or both of the file manager GUI 30 and the API.

The local-storage file system driver 22 is resident on the computer 12 and provides for access to the local storage device. The file system driver 22 responds to user file commands, such as create, open, read, write, and close, to perform such actions on files and folders stored on the local storage device 24. The file system driver 22 may further provide information about files and folders stored on the local storage device 24 in response to requests for such information.

The local storage device 24 can include one or more devices such as magnetic hard disk drive, optical drives, solid-state memory (e.g., flash memory), and similar.

The remote-storage file system driver 26 is coupled to the file manager 20 and is further coupled to the content management system interface 28. The file system driver 26 maps the content management system interface 28 as a local drive for access by the file manager 20. For example, the file system driver 26 may assign a drive letter (e.g., "H:") or mount point (e.g., "/Enterprise") to the content management system interface 28. The file system driver 26 is configured to receive user file commands from the file manager 20 and output user file information to the file manager 20. Examples of user file commands include create, open, read, write, and close, and examples of file information include file content, attributes, metadata, and permissions.

The remote-storage file system driver 26 can be based on a user-mode file system driver. The remote-storage file system driver 26 can be configured to delegate callback commands to the content management system interface 28. The callback commands can include file system commands such as Open, Close, Cleanup, CreateDirectory, OpenDirectory, Read, Write, Flush, GetFileInformation, GetAttributes, FindFiles, SetEndOfFile, SetAttributes, GetFileTime, SetFileTime, LockFile, UnLockFile, GetDiskFreeSpace, GetFileSecurity, and SetFileSecurity.

The content management system interface 28 is the interface between the computer 12 and the enterprise server 14. The content management system interface 28 connects, via the network 16, to a content management system 40 hosted on the enterprise server 14. As will be discussed later in this document, the content management system interface 28 can be configured to translate user commands received from the driver 26 into content management commands for the remote content management system 40.

The content management system interface 28 is a user-mode application that is configured to receive user file commands from the file manager 20, via the driver 26, and translate the user file commands into content management commands for sending to the remote content management system 40. The content management system interface 28 is further configured to receive remote file information from the remote content management system 40 and to translate the remote file information into user file information for providing to the file manager 20 via the driver 26.

The remote content management system 40 can be configured to expose an API 43 to the content management system interface 28 in order to exchange commands, content, and other information with the content management system interface 28. The remote content management system 40 stores directory structures 41 containing files in the form of file content 42, attributes 44, metadata 46, and permissions 48. File content 42 may include information according to one or more file formats (e.g., ".docx", ".txt", ".dxf", etc.), executable instructions (e.g., an ".exe" file), or similar. File attributes 44 can include settings such as hidden, read-only, and similar. Metadata 46 can include information such as author, date created, date modified, tags, file size, and similar. Permissions 48 can associate user or group identities to specific commands permitted (or restricted) for specific files, such as read, write, delete, and similar.

The remote content management system 40 can further include a web presentation module 49 configured to output one or more web pages for accessing and modifying directory structures 41, file content 42, attributes 44, metadata 46, and permissions 48. Such web pages may be accessible using a computer's web browser via the network 16.

The content management system interface 28 provides functionality that can be implemented as one or more programs or other executable elements. The functionality will be described in terms of distinct elements, but this is not to be taken as limiting or exhaustive. In specific implementations not all of the functionality need be implemented.

In an embodiment, the content management system interface 28 may include an authentication component 52 that is configured to prompt a user to provide credentials for access to the content management system interface 28 and for access to the remote content management system 40. Authentication may be implemented as a username and password combination, a certificate, or similar, and may include querying the enterprise server 14 or the support server 18. Once the user of the computer device 12 is authenticated, he or she may access the other functionality of the content management system interface 28.

The content management system interface 28 includes control logic 54 configured to transfer file content between the computer 12 and the server 14, apply filename masks, evaluate file permissions and restrict access to files, modify file attributes and metadata, and control the general operation of the content management system interface 28. The control logic 54 further effects mapping of remote paths located at the remote content management system 40 to local paths presentable at the file manager 20. Path mapping permits the user to select a file via the final manager 20 and have file information and/or content delivered from the remote content management system 40. In one example, the remote files and directories are based on a root path of "hostname/directory/subdirectory" that is mapped to a local drive letter or mount point and directory (e.g., "H:/hostname/directory/subdirectory").

The content management system interface 28 includes filename masks 56 that discriminate between files that are to remain local to the computer 12 and files that are to be transferred to the remote content management system 40. Temporary files may remain local, while master files that are based on such temporary files may be sent to the remote content management system 40. This advantageously prevents the transmission of temporary files to the remote content management system 40, thereby saving network bandwidth and avoiding data integrity issues (e.g., uncertainty and clutter) at the remote content management system 40.

The content management system interface 28 includes a cache 58 of temporary files, which may include working versions of files undergoing editing at the user computer device 12 or temporary files generated during a save or other operating of an application 32.

In an embodiment, the content management system interface 28 may include an encryption engine 59 configured to encrypt at least the cache 58. The encryption engine 59 can be controlled by the authentication component 52, such that a log-out or time out triggers encryption of the cache 58 and successful authentication triggers decryption of the cache 58. Other informational components of the content management system interface 28 may be encrypted as well, such as the filename masks 56. The encryption engine 59 may conform to an Advanced Encryption Standard (AES) or similar.

Figure 2:
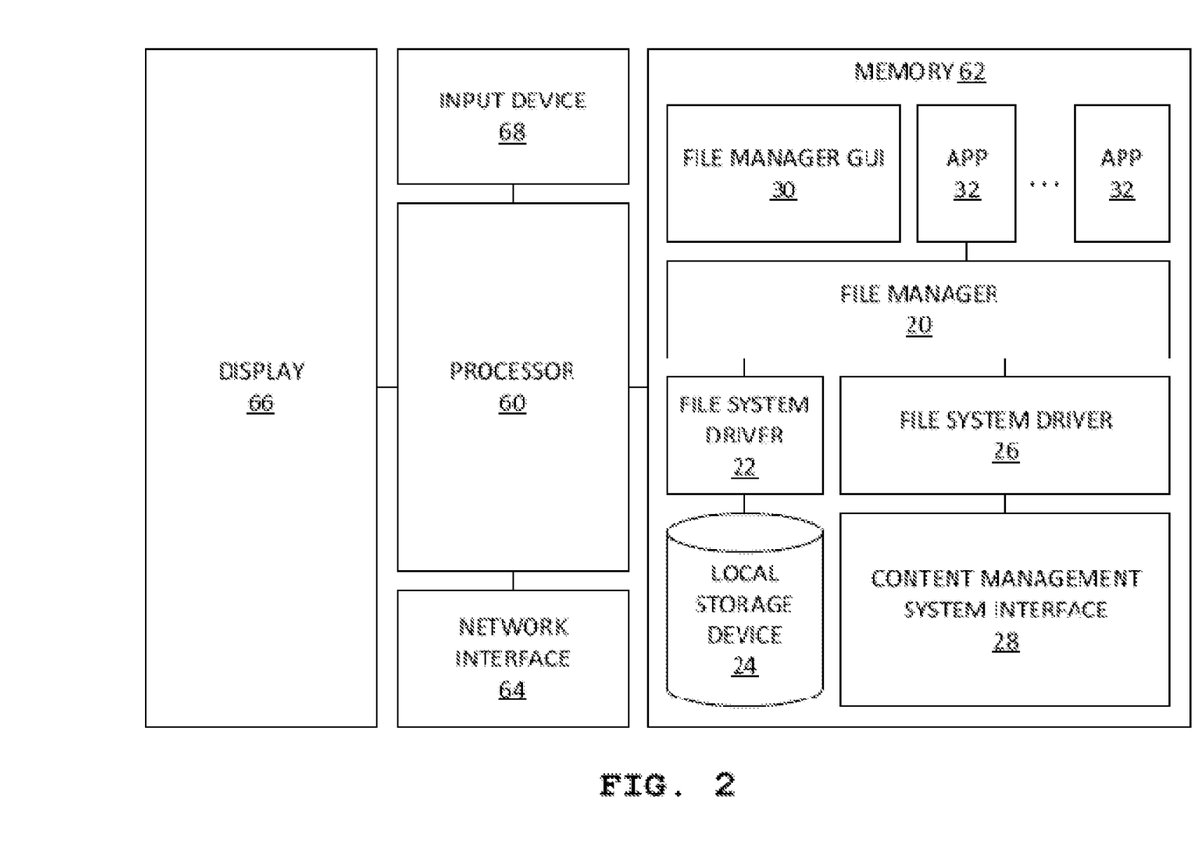
FIG. 2 is a block diagram of a user computer device.

FIG. 2 shows an example of a user computer device 12. The computer device 12 includes a processor 60, memory 62, a network interface 64, a display 66, and an input device 68. The processor 60, memory 62, network interface 64, display 66, and input device 68 are electrically interconnected and can be physically contained within a housing or frame.

The processor 60 is configured to execute instructions, which may originate from the memory 62 or the network interface 64. The processor 60 may be known as a CPU. The processor 60 can include one or more processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the client computer (e.g., fixed hard drives) as well as removable components (e.g., removable memory cards). The memory 62 allows for random access, in that programs and data may be both read and written.

The network interface 64 is configured to allow the user computer device 12 to communicate with the network 16 (FIG. 1). The network interface 64 can include one or more of a wired and wireless network adaptor and well as a software or firmware driver for controlling such adaptor.

The display 66 and input device 68 form a user interface that may collectively include a monitor, a screen, a keyboard, keypad, mouse, touch-sensitive element of a touch-screen display, or similar device.

The memory 62 stores the file manager 20, the file system driver 26, and the content management system interface 28, as well as other components discussed with respect to FIG. 1. Various components or portions thereof may be stored remotely, such as at a server. However, for purposes of this description, the various components are locally stored at the computer device 12. Specifically, it may be advantageous to store and execute the file manager 20, the file system driver 26, and the content management system interface 28 at the user computer device 12, in that a user may work offline when not connected to the network 16. In addition, reduced latency may be achieved. Moreover, the user may benefit from the familiar user experience of the local file manager 20, as opposed to a remote interface or an interface that attempts to mimic a file manager.

Figure 3:
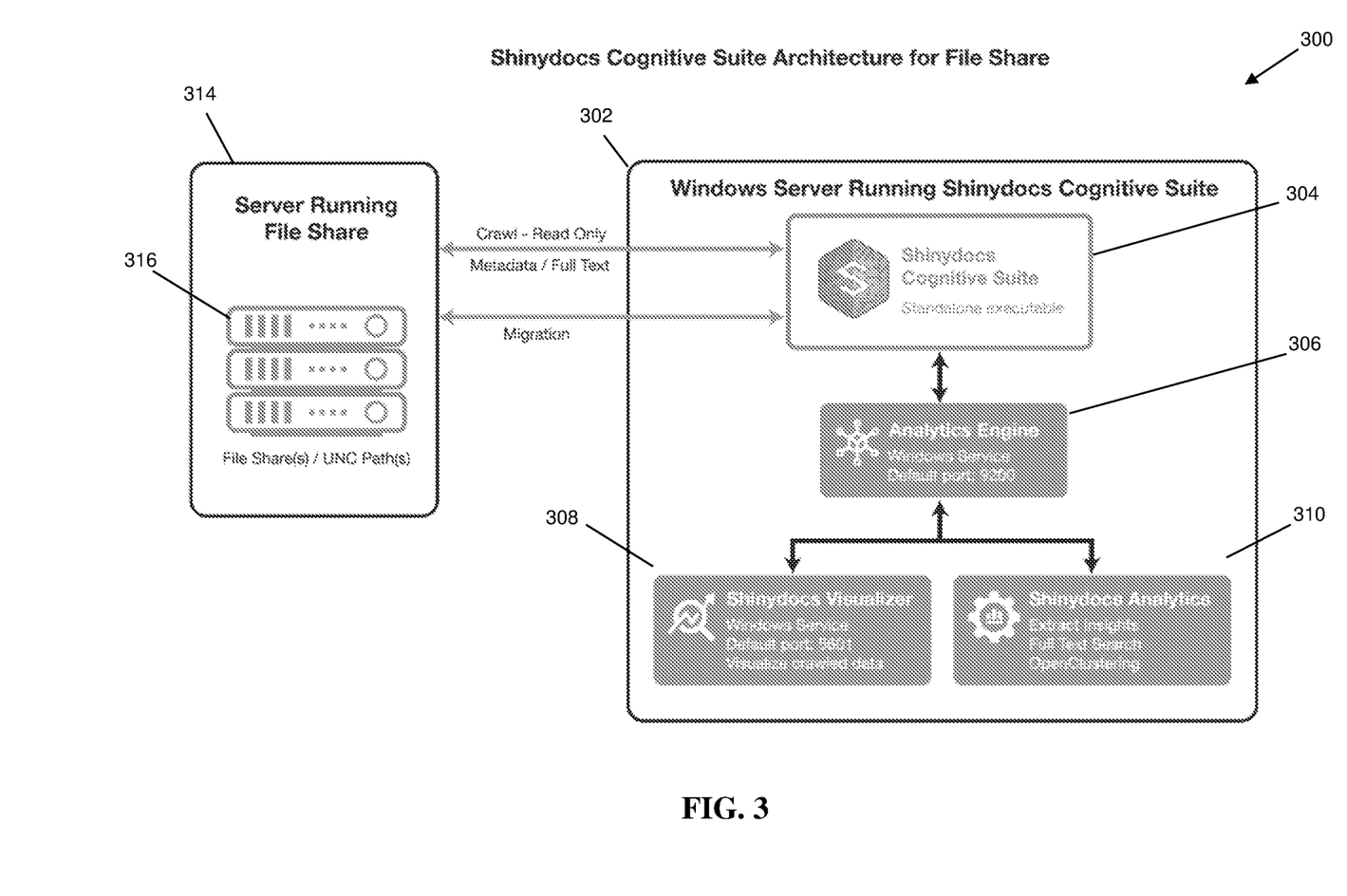
FIG. 3 is a schematic diagram illustrating an Analytics Engine.

FIG. 3 is a schematic diagram illustrating the Analytics Engine within Shinydocs Cognitive Suite. According to FIG. 3, diagram 300 illustrates a Windows Server 302 running Shinydocs Cognitive Suite 304, Analytics Engine 306, Shinydocs Visualizer 308 and Shinydocs Analytics 310.

According to FIG. 3, a separate server 314 is shown running File Shares 316. The File Shares 316, or Enterprise Content Management systems, contain files of various sizes, many of which contain text. The Shinydocs Cognitive Suite 304 can be a standalone executable that extracts metadata from files within these file shares, which are then stored in the Analytics Engine 306. The Shinydocs Cognitive Suite 304 likewise extracts text from files in these file shares, which are also stored in the Analytics Engine 110.

According to FIG. 3, Analytics Engine 306 can programmatically break apart large chunks of text when doing text extraction and will likewise logically recombine those large chunks of text for operations such as search for strings of text that are contained in the extracted text. This will be detailed later in this document.

The Analytics Engine 306 described in FIG. 3 is part of the Shinydocs Cognitive Suite 104 and interfaces with the Shinydocs Visualizer 308 and Shinydocs Analytics 310 components (or modules). The Shinydocs Visualizer module 308 enables visualization of crawled data and enables a windows service to connect to a default port (e.g., port 5601). The Shinydocs Analytics module 310 is configured to extract insights, perform full text searches and perform open clustering.

According to FIG. 3, the Analytics Engine 306 also leverages open-source search applications (such as Elasticsearch or Open Search) as the underlying technology. In this description, Elasticsearch is referenced as the search engine, but is interchangeable with other similar open-source search engines. Furthermore, Analytics Engine 306 is also configured as a Windows Service enabling connection to a default port (e.g., port 9200).

Figure 4:
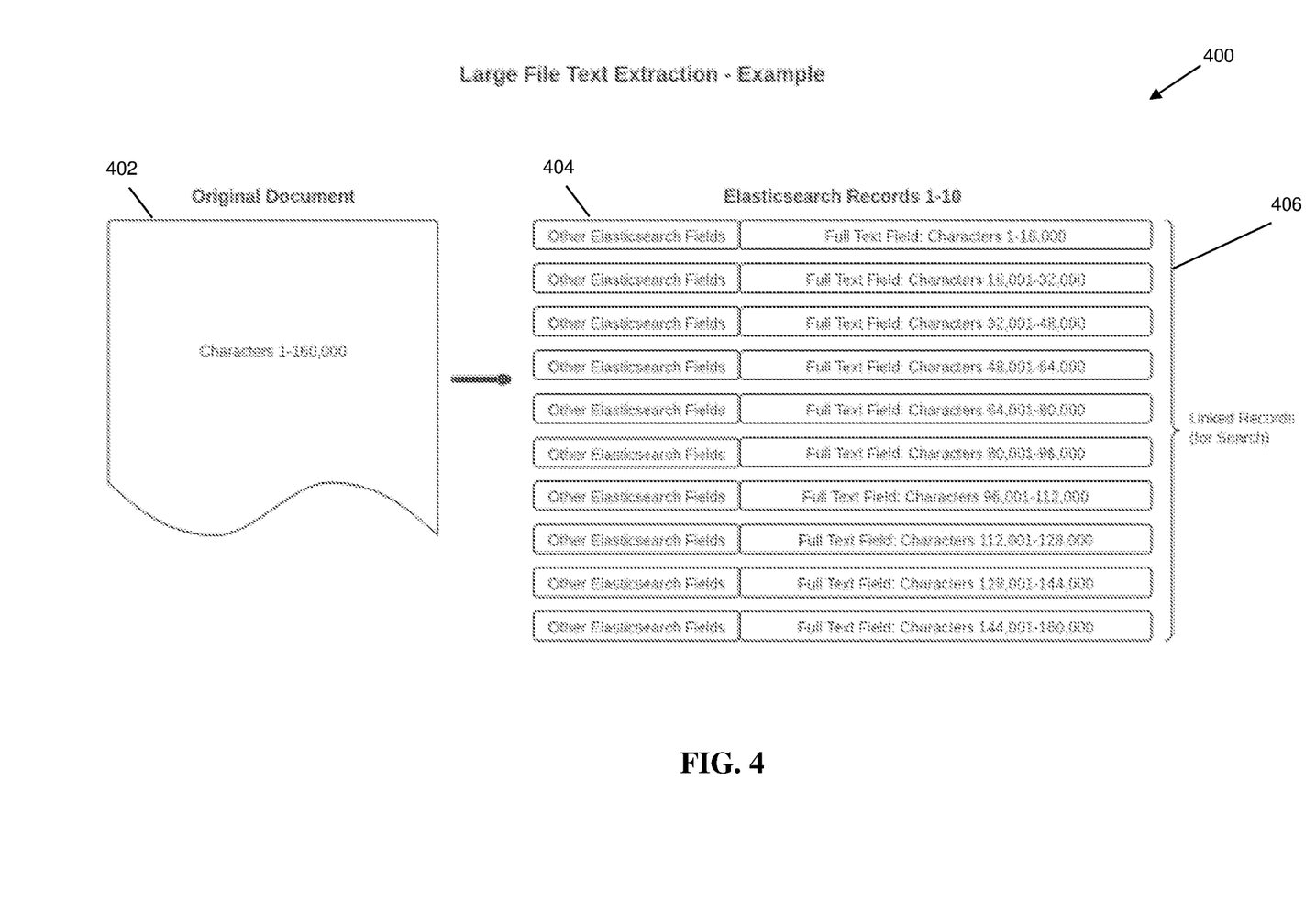
FIG. 4 is a block diagram illustrating an example decomposition of a large original document into smaller individual records in an Analytics Engine.

FIG. 4 is a diagram illustrating an example decomposition of a large original document into smaller individual records via the Analytics engine. According to diagram 400 in FIG. 4, the original document 402 is broken down into separate records 404 (e.g., ten records), which are stored separately in the Analytics Engine 306 in FIG. 3 and then linked together forming linked records 406.

Files which are indexed by Elasticsearch may have their text content be individually stored in smaller working files, referred to as "content.txt" in this example. According to this disclosure, the merging and serializing of results containing large "content.txt" fields is extremely expensive in terms of performance. To make the system omit this field during search and results composing, the system is directed to handle this field separately from other fields.

A configurable or coded parameter setting in the index mapping, will tell the system to store the "content.txt" field separately from other document's fields. This will not exclude the field from the true document source ("_source"), and the system will never omit this field during search. However, the index settings can be adjusted to omit "content.txt" by command, if that behaviour is desired.

According to the disclosure, now that the field "content.txt" is separate from "_source", from that point the system indexes "_source" and "content.txt" separately and will never touch "content.txt" on search unless the user intentionally requests it. Every search querying documents by 'small' fields will be done through dramatically reduced in size "_source"'s without searching through and merging huge "content.txt" fields. Also, the operation to query "content.txt" is now much more effective since it's stored separately and there's no need to merge it with the "_source".

With the new index settings, documents with a size greater than the established threshold (in this example, more than 100 Mb) and that contain a desired phrase found the content.txt field from the index can be queried. The average search times for an index that contains millions of documents with average size of 100 Mb can be reduced by several orders of magnitude with these modified mappings.

To achieve the desired performance efficiency in the application of the search function, this invention consists of two functional parts: a search index manager and a chunk text extractor.

Search Index Manager

According to further embodiments of this disclosure, there are issues related to indexing large files as an increase in individual file sizes results in degradations in search performance. The entire process has led to the requirement for a service that will manage all requests coming from end users to Elasticsearch such that end users will not need to have any knowledge of open-source search engines (such as Elasticsearch) in order to make requests. This aims to document the development of a service that can expose operations that an Analytics Engine (i.e., Cognitive Toolkit) is intended to achieve.

In order to index and search large files, additional structure must be introduced to the data. Attempting to use a model of a single, all-encompassing index results in performance issues related to the search engine's (Elasticsearch) need to deserialize entire documents during the search process. In order to index large files, and to maintain performance, the strategy is to introduce more records that allow for fast search without serialization penalties, which can then be loaded entirely when needed.

According to this disclosure, an Analytics Engine acts as the primary gateway to tools used to communicate with the search engine datastore. This prevents clients from needing direct access to the index and provides the ability to add additional logic required to support large data indexing. It also provides a pathway to a more distributed cognitive toolkit model.

Chunked Text Extraction

Another aspect of this approach is to extract the data content into reasonable segments (or "chunks" of data), which are each stored in Elasticsearch either by having each chunk stored as a field in a separate Elasticsearch record or combining multiple chunks as fields in a single record. The size of these chunks is configurable, with the default being 16,000 characters. As an example, if a document contains 160,000 characters of text (about 65 total pages of text in a Microsoft Word or PDF document), the system will extract that text into 10 Elasticsearch records, each containing a single text field that is 16,000 characters in length. Elasticsearch record 1 has a full text field that contains characters 1-16,000 from the original document. Elasticsearch record 2 has a full text field that contains characters 16,001-32,000 from the original document—and so on (Elasticsearch record 10 has a full text field that contains characters 144,001-160,000).

Further, a method of logically "linking" these 10 Elasticsearch records together is disclosed, since they are clearly related both in terms of "order" (so record 1 is first, record 2 is second, record 3 is third, etc.), and in origin, since they are from the same source file. For searches (or similar methods of requesting data) that may need to match text found in 2 or more of these related chunks, this search will work as expected. For example, if someone is searching for a document that contains the words "red" and "cars" anywhere in the original document (and if "red" is in the 2nd linked Elasticsearch record and "cars" is in the 8th linked Elasticsearch record), that single linked document will show as a match.

In one embodiment, a grouping layer may be implemented above the interface to the Analytics Engine. This grouping layer implements some or all of these features:

Recognizing, or being explicitly told of, by a higher layer (such as the Search Index Manager), the need to break a particular file into multiple groups or records when it is indexed, When indexing or storing a file, storing the text contents of that file into one or more groups of chunk files of an expected size, and storing the information needed to link these groups when the file is requested to be searched; and, When searching a file, using the stored information to appropriately search the grouping of records in a way that satisfies the kind of search needed.

In one embodiment, the text contents of a file are stored as tokens, with the system separating the contents into tokens upon storage or indexing of that file. In one embodiment, a space or other delimiting character (or characters) may be chosen as the tokenizing delimiters, and the text will be tokenized using those one or more individual characters to indicate where one token ends and the next token begins. For example, if the space character is chosen, the text string "The quick brown fox" may be tokenized into the tokens "The", "quick", "brown" and "fox". Without appropriate tokenization, a word may be split across a record boundary; for example, one index record may end with "The quick br" and the next record may then begin with "own fox". In such a case, searching for "brown" in this indexed document would be a more difficult task, and may require techniques such as a sliding window string comparison across the record boundary. In one embodiment, the type of file may influence the choice of tokenizing delimiters; for example, a document consisting of English text may choose to use the space character as the delimiter, while a comma-separated-values document may be better served with a comma as a delimiter. In one embodiment, the system may recognize the file type and automatically select one or more tokenizing delimiters.

In one embodiment, a search for long text (for instance, a string consisting of more than one consecutive tokens) in a large file may be broken down into multiple queries, where each token is queried in each record, and the results of these queries then combined to confirm that the results are correctly consecutive. An Elasticsearch "match" may be used for this purpose.

In one embodiment, at least one of these additional fields in Elasticsearch are configured and used: _id, _index, _score, _source, _type.

According to the disclosure, a computer-implemented method of indexing large text files for fast searching and retrieval using an Analytics Engine and an enterprise content management system is disclosed. The method comprises providing a computer processor, configuring the processor to couple with a network interface, configuring the processor, by a set of executable instructions storable in a memory to receive an original document with a plurality of discrete characters, decompose the original document into smaller separate records using the analytics engine, link the smaller separate records into a linked record and save the smaller separate records and linked record in memory.

According to the disclosure, the method further comprises using the linked smaller separate records and linked record to merge and serialize the results of the extracted text as index files for fast searching and retrieval of data from the original document and saving the smaller separate records and linked records in memory.

According to the disclosure, the smaller separate records and linked records of the method are saved as Elasticsearch records. The Elasticsearch records further comprises Elasticsearch fields and full text fields to store sequential discrete characters of the original document.

According to the disclosure, the original document of the method is configured to have 1-160K characters. The full text field of the method is configured to store up to characters that are 16K characters, 32K characters or 64K characters in size.

According to the disclosure, the method further comprises a grouping layer implemented above the interface to the Analytics Engine. The grouping layer of the method is configured to break a file into multiple records when it is indexes, storing information needed for linking when the file is requested to be searched and when searching, using the stored information to search the grouping of records.

According to the disclosure, the text contents of the original file of the method is stored as tokens. The space or other delimiting character of files in the method are chosen as tokenizing delimiters, and the text will be tokenized using one or more individual characters to indicate where one token ends and the next token begins.

According to the disclosure, a system of indexing large text files for fast searching and retrieval for data in an enterprise content management system is disclosed. The system comprises a computer processor, one or more file share of the content management system configured to store one or more original document, a content management system module configured to communicate with the file share of the content management system, an analytics module, a visualizer module configured to provide output and visualization of crawled data and an analytics engine, in communication with the content management system module and the visualizer and analytics modules.

According to the disclosure, the analytics engine of the system is configured to extract metadata and text from one or more original document within the file shares, index the extracted original document and store the extracted original document.

According to the disclosure, the extracted original documents of the system further comprises linked records configured to merge and serialize the results of the extracted text as index files for fast searching and retrieval of text data from the original document from the file share.

According to the disclosure, the file share of the system further comprises a database. The analytics module of the system is configured to extract insights, conduct full text searches or perform open clustering.

According to the disclosure, the content management system module of the system further comprises a Shinydocs Cognitive Suite module. The Shinydocs Cognitive Suite module further comprises an interface and control module.

According to the disclosure, the step of storing the extracted original document of the system further comprises saving the smaller separate records and linked records in memory. The smaller separate records and linked records are saved as Elasticsearch records and the Elasticsearch records further comprises Elasticsearch fields and full text fields to store sequential discrete characters of the original document.

While the foregoing provides certain non-limiting example embodiments, it should be understood that combinations, subsets, and variations of the foregoing are contemplated. The monopoly sought is defined by the claims.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A computer-implemented method of indexing large text files for fast searching and retrieval using an Analytics Engine and an enterprise content management system, the method comprising:
    providing a computer processor;
    configuring the processor to couple with a network interface;
    configuring the processor, by a set of executable instructions storable in a memory, configured to:
        receive an original document with a plurality of discrete characters;
        decompose the original document into smaller separate records using the analytics engine;
        link the smaller separate records into a linked record; and
        save the smaller separate records and linked record in memory;
    using the linked smaller separate records and linked record to merge and serialize the results of the extracted text as index files for fast searching and retrieval of data from the original document.

2. The computer-implemented method of claim 1 further comprises the step of saving the smaller separate records and linked records in memory.

3. The computer-implemented method of claim 1 wherein the smaller separate records and linked records are saved as Elasticsearch records.

4. The computer-implemented method of claim 3 wherein the Elasticsearch records further comprises Elasticsearch fields and full text fields to store sequential discrete characters of the original document.

5. The computer-implemented method of claim 1 wherein the original document is configured to have 1-160K characters.

6. The computer-implemented method of claim 1 wherein the full text field is configured to store up to characters that are 16K characters, 32K characters or 64K characters in size.

7. The computer-implemented method of claim 1 further comprises a grouping layer implemented above the interface to the Analytics Engine.

8. The computer-implemented method of claim 7 wherein the grouping layer is configured to break a file into multiple records when it is indexes, storing information needed for linking when the file is requested to be searched and when searching, using the stored information to search the grouping of records.

9. The computer-implemented method of claim 1 wherein the text contents of the original file is stored as tokens.

10. The computer-implemented method of claim 9 wherein a space or other delimiting character are chosen as tokenizing delimiters, and the text will be tokenized using one or more individual characters to indicate where one token ends and the next token begins.

11. A system of indexing large text files for fast searching and retrieval for data in an enterprise content management system, the system comprising:
    a computer processor;
    one or more file share of the content management system configured to store one or more original document;
    a content management system module configured to communicate with the file share of the content management system;
    an analytics module;
    a visualizer module configured to provide output and visualization of crawled data; and
    an analytics engine, in communication with the content management system module and the visualizer and analytics modules, the analytics engine configured to:
        extract metadata and text from one or more original document within the file shares;
        index the extracted original document; and
        store the extracted original document;
    wherein the extracted original documents further comprise linked records configured to merge and serialize the results of the extracted text as index files for fast searching and retrieval of text data from the original document from the file share.

12. The system of claim 11 wherein the file share further comprises a database.

13. The system of claim 11 wherein the analytics module is configured to extract insights.

14. The system of claim 11 wherein the analytics module is configured to conduct full text searches.

15. The system of claim 11 wherein the analytics module is configured to perform open clustering.

16. The system of claim 11 wherein the content management system module further comprises a Shinydocs Cognitive Suite module.

17. The system of claim 16 wherein the Shinydocs Cognitive Suite module further comprises an interface and control module.

18. The system claim 11 wherein the step of storing the extracted original document further comprises saving the smaller separate records and linked records in memory.

19. The system of claim 18 wherein the smaller separate records and linked records are saved as Elasticsearch records.

20. The system of claim 19 wherein the Elasticsearch records further comprises Elasticsearch fields and full text fields to store sequential discrete characters of the original document.

* * * * *